(12) United States Patent
Hen et al.

(10) Patent No.: US 11,786,977 B2
(45) Date of Patent: Oct. 17, 2023

(54) TOOL HOLDER HAVING ANTI-VIBRATION ARRANGEMENT WITH TWO MASSES AND CUTTING TOOL PROVIDED WITH TOOL HOLDER

(71) Applicant: ISCAR, LTD., Tefen (IL)

(72) Inventors: Daniel Hen, Nahariya (IL); Rafi Rabouh, Neve Ziv (IL); Jony Saffouri, Nazareth Eilit (IL)

(73) Assignee: Iscar, Ltd., Tefen (IL)

( * ) Notice: Subject to any disclaimer, the term of this patent is extended or adjusted under 35 U.S.C. 154(b) by 303 days.

(21) Appl. No.: 17/467,877

(22) Filed: Sep. 7, 2021

(65) Prior Publication Data

US 2023/0070392 A1     Mar. 9, 2023

(51) Int. Cl.
*B23B 47/00* (2006.01)
*B23B 29/12* (2006.01)
*F16F 7/104* (2006.01)

(52) U.S. Cl.
CPC ............ *B23B 29/125* (2013.01); *F16F 7/104* (2013.01); *B23B 2250/16* (2013.01)

(58) Field of Classification Search
CPC .............. B23B 29/125; B23B 2250/16; B23B 2250/12; B23B 29/022; B23B 27/002; F16F 7/104
See application file for complete search history.

(56) References Cited

U.S. PATENT DOCUMENTS

| | | | |
|---|---|---|---|
| 3,559,512 A | 2/1971 | Aggarwal | |
| 3,690,414 A | 9/1972 | Aggarwal et al. | |
| 4,050,665 A | 9/1977 | Matthews et al. | |
| 4,130,185 A | 12/1978 | Densmore | |
| 4,903,785 A | 2/1990 | Odoni et al. | |
| 7,661,912 B2 | 2/2010 | Onozuka et al. | |
| 7,681,869 B2 | 3/2010 | Digernes | |
| 9,027,720 B2* | 5/2015 | Ogata | F16F 7/08 188/380 |
| 11,491,551 B2* | 11/2022 | Buck | B23B 29/022 |
| 2003/0147707 A1* | 8/2003 | Perkowski | F16F 7/10 407/30 |

(Continued)

FOREIGN PATENT DOCUMENTS

JP     2011-011276     1/2011

OTHER PUBLICATIONS

International Search Report dated Dec. 6, 2022, issued in PCT counterpart application No. PCT/IL2022/050860.

(Continued)

*Primary Examiner* — Amy J. Sterling
(74) *Attorney, Agent, or Firm* — Womble Bond Dickinson (US) LLP

(57) ABSTRACT

An elongated tool holder has a tool anti-vibration component constituting a mass housing portion provided with an enclosed interior cavity, and an anti-vibration arrangement occupying the enclosed interior cavity. The anti-vibration arrangement includes two vibration absorbing masses disposed within the holder cavity and elastically suspended therein by at least three resilient suspension members contacting an inwardly facing cavity wall surface. The two vibration absorbing masses are made from different materials and have different lengths. A cutting tool is provided with the tool holder.

13 Claims, 3 Drawing Sheets

(56) References Cited

U.S. PATENT DOCUMENTS

2015/0375305 A1* 12/2015 Frota de Souza Filho .................. B23B 27/002
                                                                      76/108.1
2016/0312848 A1   10/2016  Freyermuth et al.
2017/0197251 A1    7/2017  Nakatani et al.

OTHER PUBLICATIONS

Written Opinion dated Dec. 6, 2022, issued in PCT counterpart application No. PCT/IL2022/050860.

* cited by examiner

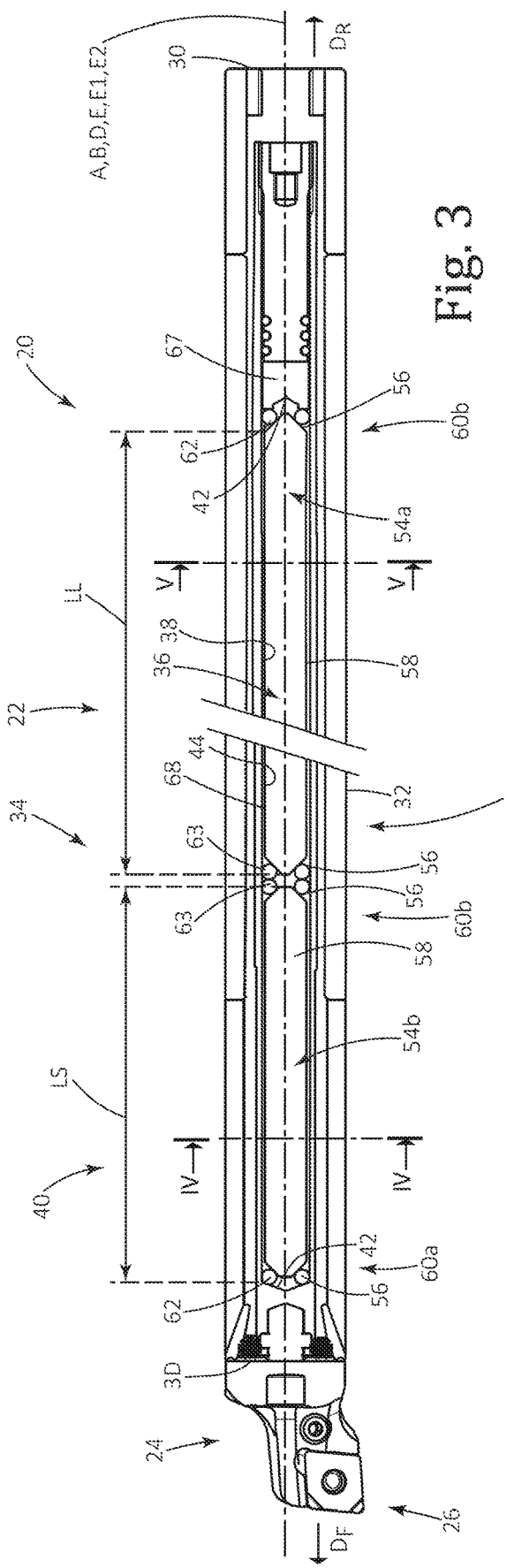
Fig. 3
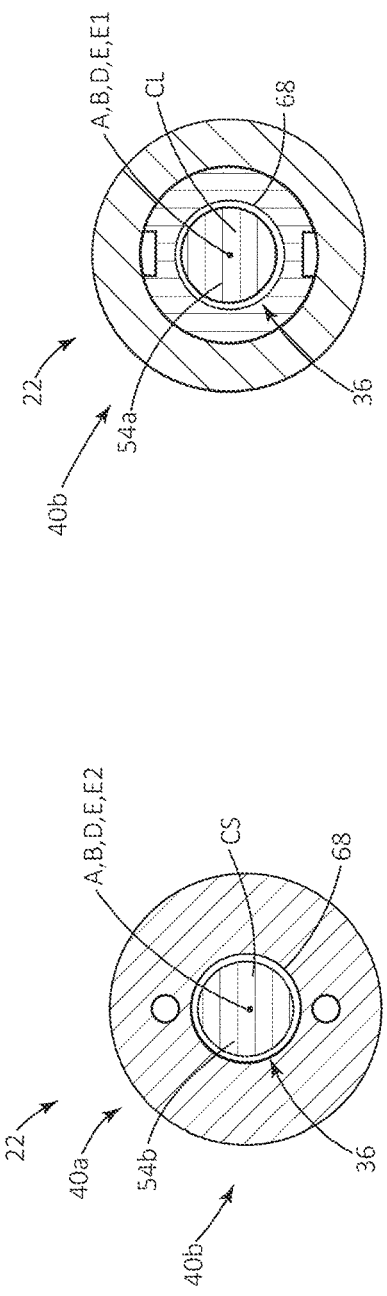
Fig. 5
Fig. 4

TOOL HOLDER HAVING ANTI-VIBRATION ARRANGEMENT WITH TWO MASSES AND CUTTING TOOL PROVIDED WITH TOOL HOLDER

FIELD OF THE INVENTION

The subject matter of the present application relates to tool holders, in general, and to such tool holders having an anti-vibration arrangement, in particular, and to such an anti-vibration arrangement having two vibration absorbing masses, further in particular.

BACKGROUND OF THE INVENTION

Tool holders can be provided with an anti-vibration arrangement for suppressing vibration of the tool holder during metal cutting operations. Typically, the anti-vibration arrangement is a spring-mass system that includes a cavity and a vibration absorbing mass suspended therein by elastic supporting members.

In some such anti-vibration arrangements, said spring-mass system can include two vibration absorbing masses. Examples of such tool holding systems, are disclosed in, for example, U.S. Pat. Nos. 3,559,512, 3,690,414, 4,050,665, 4,130,185 and 4,903,785.

It is an object of the subject matter of the present application to provide a new and improved anti-vibration arrangement.

SUMMARY OF THE INVENTION

In accordance with a first aspect of the subject matter of the present application there is provided a tool holder elongated along a holder longitudinal axis thereof, which defines opposite forward and rearward directions, the tool holder configured to be secured at a rear end thereof, the tool holder comprising:
  a mass housing portion comprising an interior holder cavity having an inwardly facing cavity wall surface; and
  an anti-vibration arrangement comprising:
    two vibration absorbing masses including a long vibration absorbing mass having a long mass central axis, and a short vibration absorbing mass having a short mass central axis, each of the long and short vibration absorbing masses having axially opposite forward and rear mass ends; and
    at least three resilient suspension members; wherein:
      the long vibration absorbing mass extends along the long mass central axis for a long mass axial length and comprises a long mass material;
      the short vibration absorbing mass extends along the short mass central axis for a short mass axial length and comprises a short mass material;
      the short mass axial length is less than the long mass axial length and the long and short vibration absorbing masses are made of different materials; and
      the tool holder is adjustable between an unassembled state and an assembled state, and in the assembled state:
        the two vibration absorbing masses are disposed in the interior holder cavity and are elastically suspended therein by the at least three suspension members contacting the inwardly facing cavity wall surface.

In accordance with a second aspect of the subject matter of the present application there is provided a cutting tool comprising:
  a tool holder of the type described above; and
  a cutting portion located at a forward end of the tool holder, the cutting portion (24) comprising at least one cutting insert.

It is understood that the above-said is a summary, and that features described hereinafter may be applicable in any combination to the subject matter of the present application, for example, any of the following features may be applicable to the tool holder or cutting tool:

The long and short vibration absorbing masses can be axially offset along the holder longitudinal axis, so that one of the long and short vibration absorbing masses is closer to the forward end of the tool holder than the other.

The short vibration absorbing mass can be located closer to the forward end of the tool holder than the long vibration absorbing mass.

Whichever one of the long and short vibration absorbing masses is closer to the forward end of the tool holder can have a density which is greater than a density of other one of the long and short vibration absorbing masses.

The long mass material can be more rigid than the short mass material.

The at least three suspension members can comprise at least one central suspension member. The long and short vibration absorbing masses can be spaced apart by the at least one central suspension member.

The anti-vibration arrangement can comprise four suspension members including one suspension member located at the forward mass end of an axially forward of the two vibration absorbing masses, another suspension member located at the rearward mass end of an axially rearward of the two the two vibration absorbing masses, and two central suspension members spacing apart the two vibration absorbing masses.

The two central suspension members can be in elastic contact with each other.

The anti-vibration arrangement can comprise exactly two vibration absorbing masses.

The long vibration absorbing mass can have a constant long mass cross-sectional area in a plane oriented perpendicular to the long mass central axis distal the mass ends of the long vibration absorbing mass. The short vibration absorbing mass can have a constant short mass cross-sectional area in a plane oriented perpendicular to the short mass central axis distal the mass ends of the short vibration absorbing mass. The long mass cross-sectional area can be the same as the short mass cross-sectional area.

Both vibration absorbing masses can have cylindrical shapes with identical diameters. In the assembled state, the long mass central axis and the short mass central axis can be aligned and share a mass common central axis which is parallel to the holder longitudinal axis.

The cutting portion can be releasably attached to the tool holder.

BRIEF DESCRIPTION OF THE FIGURES

For a better understanding of the present application and to show how the same may be carried out in practice, reference will now be made to the accompanying drawings, in which:

FIG. 3 is an axial cross-sectional view of the cutting tool in FIG. 1.

FIG. 4 is a radial cross-sectional view of the cutting tool in FIG. 1 taken along line IV-IV in FIG. 3; and FIG. 5 is a radial cross-sectional view of the cutting tool in FIG. 1 taken along line V-V in FIG. 3.

Figure 1:
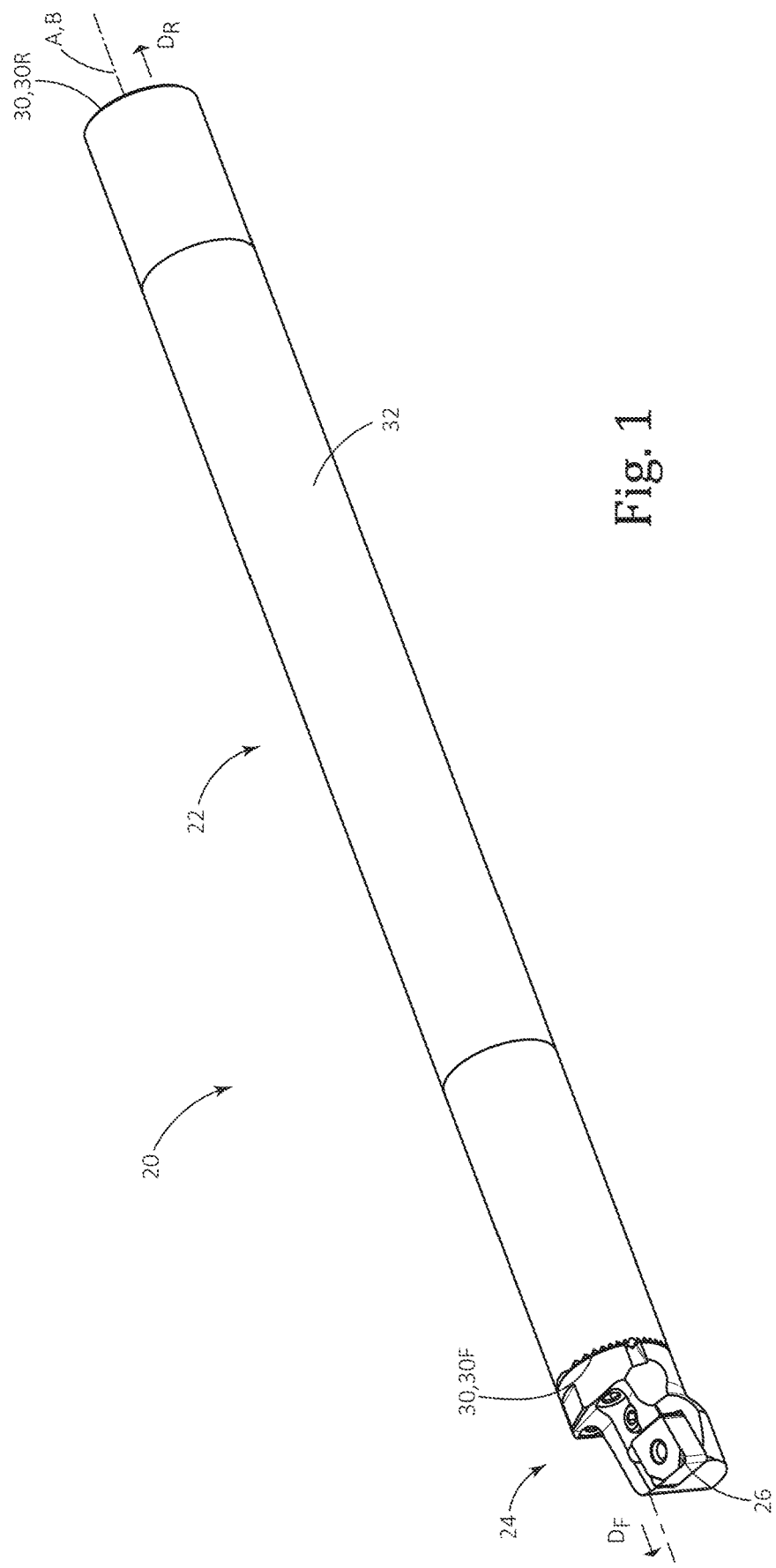
FIG. 1 is a perspective view of a cutting tool in accordance with the present application, showing an anti-vibration arrangement.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIG. 1 showing a cutting tool 20, for chip removal, depicting an aspect of the present application. The cutting tool 20 has a tool longitudinal axis A. In accordance with some embodiments of the subject matter of the present application, the cutting tool 20 can be a fixed cutting tool. That is to say, the cutting tool 20 is not designed to rotate about a rotational axis. In this non-limiting example shown in the drawings, the cutting tool 20 is a boring bar. However, the subject matter of the present application is not restricted only to boring bars and could also be applicable to, for example but not limited to, turning tools in general. The subject matter of the present application may also be applicable to rotary cutting tools, such as milling cutters and drills. For such rotary cutting tools, the cutting tool 20 is designed to be rotatable in a direction of rotation about the tool longitudinal axis A.

The cutting tool 20 includes a tool holder 22. The cutting tool 20 also includes a cutting portion 24 that can include at least one cutting insert 26. The at least one cutting insert 26 is designed to perform metal cutting operations and has a cutting edge for that purpose. In accordance with some embodiments of the subject matter of the present application, the at least one cutting insert 26 can be releasably attached to the cutting portion 24. The cutting portion 24 can be integrally formed with the tool holder 22. Alternatively, as seen in the non-limiting example shown in the drawings, the cutting portion 24 can be releasably attached to the tool holder 22. The cutting portion 24 can be disposed at a forward end of the tool holder 22. The rear end of the tool holder 22 is configured to be secured by a holding device.

Figure 2:
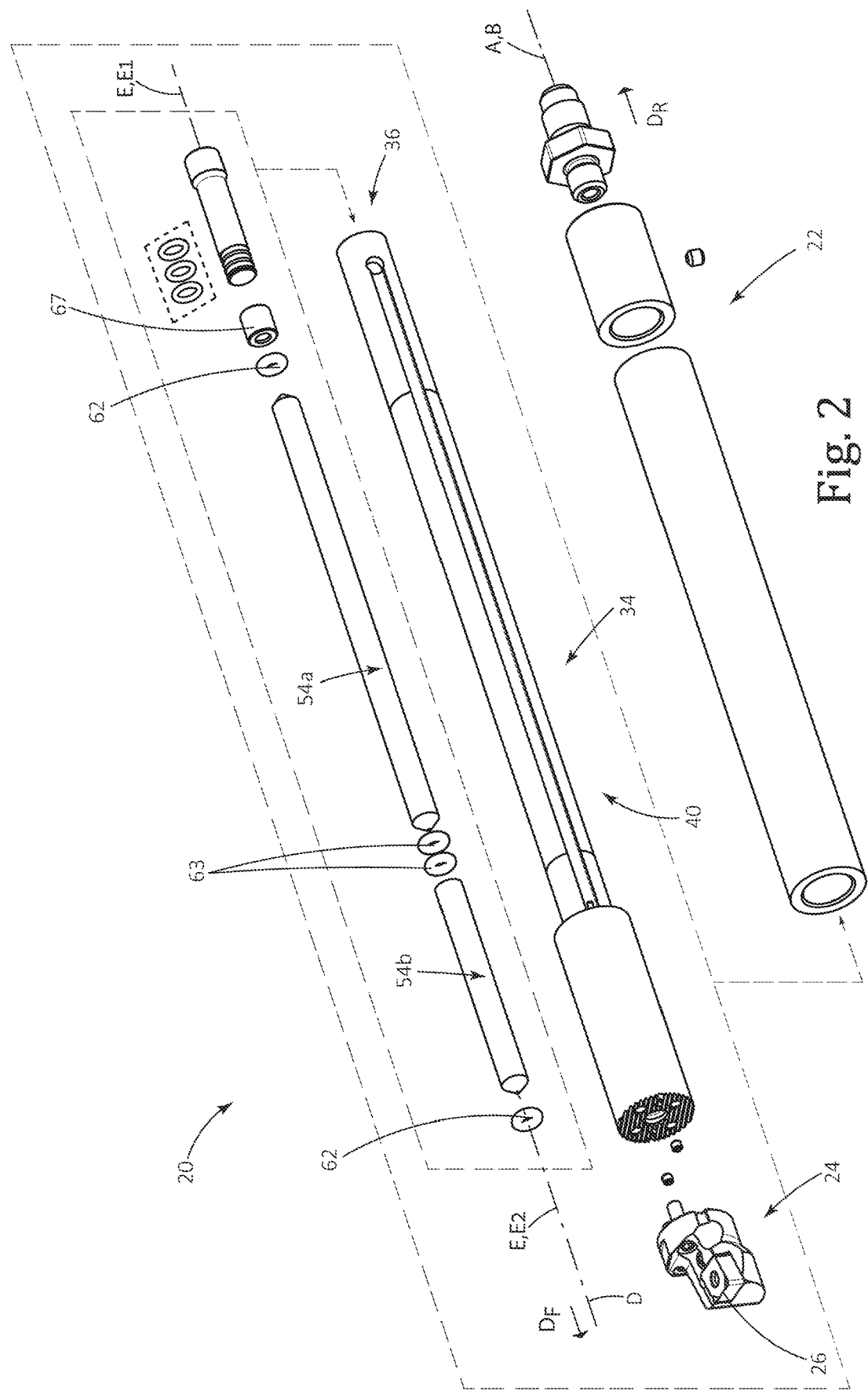
FIG. 2 is an exploded perspective view of the cutting tool in FIG. 1, in accordance with the present application.

Reference is now made to FIG. 2, showing an exploded view of the tool holder 22, depicting another aspect of the present application. The tool holder 22 has a holder longitudinal axis B, that defines opposite forward and rear directions $D_F$, $D_R$. The tool holder 22 is elongated along the holder longitudinal axis B. In accordance with some embodiments of the subject matter of the present application, the cutting tool 20 and the tool holder 22 can be co-axial with each other. It should be noted that two elements (e.g. the cutting tool 20 and the tool holder 22 in the present case) are co-axial with each other when their longitudinal axes are co-incident (aligned with other).

It should further be noted that use of the terms "forward" and "rearward" throughout the description and claims refer to a relative position in a direction of the holder longitudinal axis B towards the left and right, respectively, in FIG. 3. Generally speaking, the forward direction is the direction towards the cutting portion 24.

In accordance with some embodiments of the subject matter of the present application, the tool holder 22 can include two opposite forward and rear holder end surfaces 30F, 30R, respectively, and a holder peripheral surface 32 that extends therebetween. The holder peripheral surface 32 can extend about the holder longitudinal axis B. In this non-limiting example shown in the drawings, one of the holder end surfaces 30 (e.g., the forward holder end surface 30F) is serrated for engagement with a corresponding surface of the cutting portion 26.

The tool holder 22 includes a mass housing portion 40 and an anti-vibration arrangement 34. The tool anti-vibration arrangement 34 is designed to reduce or eliminate vibration of the cutting tool 20 when the cutting tool 20 performs a metal cutting operation. In accordance with some embodiments of the subject matter of the present application, the anti-vibration arrangement 34 can be disposed at a forward end of the cutting tool 20.

The mass housing portion 40 has an interior holder cavity 36 formed therein. That is to say, the interior holder cavity 36 is enclosed within the mass housing portion 40. The holder cavity 36 is formed, at least in part, by an inwardly facing cavity wall surface 38. The cavity wall surface 38 delimits the holder cavity 36 from the mass housing portion 40. The mass housing portion 40 surrounds the holder cavity 36. The holder cavity 36 has a cavity central axis D. In accordance with some embodiments of the subject matter of the present application, the holder cavity 36 can be elongated along a cavity central axis D. The holder cavity 36 can be elongated in the same direction as the tool holder 22. In particular, the holder cavity 36 can be co-axial with the tool holder 22. The cavity wall surface 38 can include two opposite cavity wall end surfaces 42 and a cavity wall peripheral surface 44 that extends therebetween. The cavity wall peripheral surface 44 can extend about the cavity central axis D.

Referring in addition to FIG. 3, showing an axial cross-sectional view of the holder cavity 36 (taken in a plane containing the cavity central axis D) through the cavity wall peripheral surface 44, the holder cavity 36 has a cavity transverse cross-section. In accordance with some embodiments of the subject matter of the present application, said cavity transverse cross-section can be uniform along the cavity central axis D. The cavity wall peripheral surface 44 can have a generally cylindrical shape. The cavity wall peripheral surface 44 can have a cylindrical shape in the vicinity of the two cavity wall end surface 42 (where the cavity wall peripheral surface 44 abuts a suspension member 62 as described later in the description). The two cavity wall end surfaces 42 can be planar and oriented transversely to the cavity central axis D. The two cavity wall end surfaces 42 can be oriented perpendicular to the cavity central axis D.

Reverting to FIGS. 1 and 2, the present tool holder 22 also includes an anti-vibration arrangement 34 comprising a plurality of vibration absorbing masses 54a, 54b. Preferably, the anti-vibration arrangement 34 can include exactly two vibration absorbing masses 54a, 54b.

The two vibration absorbing masses 54a, 54b include a long vibration absorbing mass 54a which comprises a long mass material. The long vibration absorbing mass 54a extends along the long mass central axis E1 for a long mass axial length LL. The two vibration absorbing masses 54a, 54b also include a short vibration absorbing mass 54b which comprises a short mass material. The short vibration absorbing mass 54b extends along the short mass central axis E2 for a short mass axial length LS. The short mass axial length LS is less than the long mass axial length LL. The long and short mass materials are different. That is to say, the long and short vibration absorbing mass 54a, 54b are made of different materials. Preferably, both mass materials are non-magnetic. For example, the short mass material can be tungsten and the long mass material can be tungsten carbide. In accordance with some embodiments of the subject matter of the present application, the long mass material can be more rigid than the short mass material (i.e., the long mass material has a Young's Modulus greater than the short mass material). This reduces the likelihood of the long vibration absorbing mass 54a (which makes up a majority of the axial length of the spring-mass system) of bending and possibly hitting the cavity wall peripheral surface 44.

Referring to FIGS. 2-3, each of the two vibration absorbing masses 54a, 54b has a corresponding mass central axis E1, E2. In the assembled tool holder 22, the mass central axes E1, E2 may be coaxial, with the masses 54a, 54b sharing the same mass common central axis E. Each of the two vibration absorbing masses 54a, 54b includes two axially opposite mass ends 60a, 60b, a forward mass end 60a and a rearward mass end 60b, the forward mass end 60a being forward of the rearward mass end 60b. The two axially opposite mass ends 60a, 60b are spaced apart from one another along the corresponding mass central axis E1, E2. In accordance with some embodiments of the subject matter of the present application, each vibration absorbing mass 54a, 54b can include two opposite mass end surfaces 56 and a mass peripheral surface 58 that extends therebetween. The mass peripheral surface 58 can extend about the corresponding mass central axis E1, E2. The two mass end surfaces 56 are located at the two mass ends 60a, 60b, respectively. Each vibration absorbing mass 54a, 54b can be elongated along the corresponding mass central axis E1, E2. It is noted that the long and short mass axial lengths LL, LS are measured between the respective mass end surfaces 56, in the direction of the corresponding mass central axis E1, E2.

Referring to FIG. 4, showing a cross-sectional view of the tool holder in a plane perpendicular to the holder longitudinal axis B through a central portion of the short vibration absorbing mass 54b (i.e. distal the respective mass ends 60a, 60b), the short vibration absorbing mass 54b can have a constant short mass cross-sectional area CS in a plane oriented perpendicular to the short mass central axis E2. Referring to FIG. 5, showing a cross-sectional view of the tool holder in a plane perpendicular to the holder longitudinal axis B through a central portion of the long vibration absorbing mass 54a (i.e. distal the respective mass ends 60a, 60b), between the mass end surfaces 56, the long vibration absorbing mass 54a can have a constant long mass cross-sectional area CL in a plane oriented perpendicular to the long mass central axis E1. The long mass cross-sectional area CL can be the same as the short mass cross-sectional area CS. Thus, in embodiments where the two masses 54a, 54b both have cylindrical shapes, they may have identical diameters.

Referring to FIG. 3, in accordance with some embodiments of the subject matter of the present application, the mass end surfaces 56 can be conically shaped, tapering inwardly in a direction away from a central portion of the vibration absorbing mass 54a, 54b. The mass peripheral surface 58 can have a cylindrical shape.

The anti-vibration arrangement 34 further includes at least three resilient suspension members 62. The at least three suspension members 62 are elastically deformable. In accordance with some embodiments of the subject matter of the present application, the at least three suspension members 62 can be formed from a material different from that of the two vibration absorbing masses 54a, 54b. In some embodiments, the suspension members 62 are made of rubber, having a Durometer hardness of between 60 A to 95 A. The at least three suspension members 62 can be o-rings.

The tool holder 22 is adjustable between an unassembled state and an assembled state. In the unassembled state of the tool holder 22, the two vibration absorbing masses 54a, 54b are disposed outside the interior holder cavity 36.

In accordance with some embodiments of the subject matter of the present application, referring to FIG. 3, the tool holder 22 includes a cavity axial sealing member 67 which defines (delimits) the holder cavity 36 in the rearward direction $D_R$, and which seals the holder cavity 36. That is to say, the cavity axial sealing member 67 forms one of the cavity wall end surfaces 38. While the holder cavity 36 is unsealed by the cavity axial sealing member 67 (i.e. while the tool holder 22 is in an unassembled position), the two vibration absorbing masses 54a, 54b can be inserted into the holder cavity 36. In the assembled state of the tool holder 22, the holder cavity 36 is sealed by the cavity axial sealing member 67.

In the assembled state of the tool holder 22, the two vibration absorbing masses 54a, 54b are disposed within the holder cavity 36. Also, their respective central axes E1, E2 may be aligned thereby sharing the mass common central axis E.

In accordance with some embodiments of the subject matter of the present application, the long and short vibration absorbing masses 54a, 54b can be axially offset along the holder longitudinal axis B. Thus, one of the long and short vibration absorbing masses 54a, 54b is closer to the forward end of the tool holder 22 than the other. Preferably, the short vibration absorbing mass 54b can be located closer to the forward end of the tool holder 22 than the long vibration absorbing mass 54a. Testing has shown that having the shortest mass closer to the cutting region improves the damping effect.

In accordance with some embodiments of the subject matter of the present application, whichever one of the long and short vibration absorbing masses 54a, 54b is closer to the forward end of the tool holder 22 constitutes a first material having a first density which is greater than a second density of a second material constituting the other one of the long and short vibration absorbing masses 54a, 54b. Thus, in the configuration where the short vibration absorbing masses 54b is closer to the forward end of the tool holder 22, the short mass material is denser than the long mass material, and when the long vibration absorbing mass 54a is closer to the forward end of the tool holder 22, the long mass material is denser. Having the densest mass closer to the cutting region has been found to improve the damping effect.

In the assembled position of the tool holder 22, in accordance with some embodiments of the subject matter of the present application, the two vibration absorbing masses 54a, 54b can be elongated in the same direction as the tool holder 22. That is to say, the mass common central axis E can be parallel to the holder longitudinal axis B with axes B, E establishing the longest principal dimensions of the tool holder 22 and also those of the vibration absorbing masses 54a, 54b, respectively. In particular, the mass common central axis E can be co-incident with the holder longitudinal axis B (i.e. the two vibration absorbing masses 54a, 54b can be co-axial with the tool holder 22).

In the assembled position of the tool holder 22, the two vibration absorbing masses 54a, 54b are connected to the mass housing portion 40 via the at least three suspension members 62. Thus, the two vibration absorbing masses 54a, 54b are elastically suspended in the holder cavity 36 by the at least three suspension members 62 which contact the inwardly facing cavity wall surface 38. Each suspension member 62 can abut a respective mass end surface 56. It is noted that no part of the mass peripheral surface 58 is in direct contact with the inwardly facing cavity wall surface 38. In accordance with some embodiments of the subject matter of the present application, each of the at least three suspension members 62 can be under compressive elastic deformation by contact against the inwardly facing cavity wall surface 38 and against one of the mass end surfaces 56.

In accordance with some embodiments of the subject matter of the present application, the at least three suspension members can include at least one central suspension member indicated by reference character 63. The long and short vibration absorbing masses 54a, 54b can be spaced apart by, and in contact with, the at least one central suspension member 63. In this non-limiting example shown in the drawings, the anti-vibration arrangement 34 can include a total of four suspension members, one suspension member 62 located at the forward mass end 60a of an axially forward one or the vibration absorbing masses, another suspension member 62 located at the rearward mass end 60b of an axially rearward one of the vibration absorbing masses, and two central suspension members 63 spacing apart the two vibration absorbing masses 54a, 54b. The two central suspension members 63 can be in elastic contact with each other. Each of the two central suspension members 63 can be in contact with only one of the two vibration absorbing masses 54a, 54b.

The anti-vibration arrangement 34 includes an oscillating space 68 formed in the holder cavity 36. The oscillating space 68 is located between the two vibration absorbing masses 54a, 54b and the mass housing portion 40 (and more particularly between the two vibration absorbing masses 54a, 54b and the inwardly facing cavity wall surface 38). Stated differently, the mass housing portion 40 and the two vibration absorbing masses 54a, 54b are spaced apart by the oscillating space 68. In accordance with some embodiments of the subject matter of the present application, the oscillating space 68 entirely circumferentially surrounds the two vibration absorbing masses 54a, 54b. That is to say, the oscillating space 68 can extend about the full) (360°) angular extent of the cavity central axis D. The oscillating space 68 can thus be considered an annular oscillating space that surrounds an axial extent of the two vibration absorbing masses 54a, 54b.

The two vibration absorbing masses 54a, 54b are configured to oscillate within the oscillating space 68 upon elastic deformation of the at least three suspension members 62. Stated differently, the two vibration absorbing masses 54a, 54b is oscillatingly displaceable within the oscillating space 68 when the at least three suspension members 62 undergo elastic deformation.

When the cutting tool 20 encounters a workpiece, it is susceptible to vibration. Typically, for turning or milling cutting operations the vibrations are lateral vibrations. Typically, for drilling cutting operations, the vibrations are torsional vibrations. The two vibration absorbing masses 54a, 54b oscillates at a vibration frequency. The anti-vibration arrangement is 34 designed to provide the two vibration absorbing masses 54a, 54b with a vibration frequency close to, if not to identical to, the natural frequency of the cutting tool 20, thereby reducing or eliminating vibration of the cutting tool 20.

In accordance with some embodiments of the subject matter of the present application, the oscillating space 68 can be empty. For example, the oscillating space 68 can be devoid of viscous fluid.

Although the subject matter of the present application has been described to a certain degree of particularity, it should be understood that various alterations and modifications could be made without departing from the spirit or scope of the invention as hereinafter claimed.

What is claimed is:

1. A tool holder (22) elongated along a holder longitudinal axis (B) thereof, which defines opposite forward and rearward directions ($D_F$, $D_R$), the tool holder (22) configured to be secured at a rear end thereof, the tool holder (22) comprising:

a mass housing portion (40) comprising an interior holder cavity (36) having an inwardly facing cavity wall surface (38): and an anti-vibration arrangement (34) comprising:
two vibration absorbing masses (54a, 54b) including a long vibration absorbing mass (54a) having a long mass central axis (E1), and a short vibration absorbing mass (54b) having a short mass central axis (E2), each of the long and short vibration absorbing masses (54a, 54b) having axially opposite forward and rear mass ends (60a, 60b); and
at least three resilient suspension members (62); wherein:
the long vibration absorbing mass (54a) extends along the long mass central axis (E1) for a long mass axial length (LL) and comprises a long mass material;
the short vibration absorbing mass (54b) extends along the short mass central axis (E2) for a short mass axial length (LS) and comprises a short mass material;
the short mass axial length (LS) is less than the long mass axial length (LL) and the long and short vibration absorbing masses (54a, 54b) are made of different materials; and
the tool holder (22) is adjustable between an unassembled state and an assembled state, and in the assembled state:
the two vibration absorbing masses (54a, 54b) are disposed in the interior holder cavity (36) and are elastically suspended therein by the at least three suspension members (62) contacting the inwardly facing cavity wall surface (38).

2. The tool holder (22), according to claim 1, wherein the long and short vibration absorbing masses (54a, 54b) are axially offset along the holder longitudinal axis (B), so that one of the long and short vibration absorbing masses (54a, 54b) is closer to the forward end of the tool holder (22) than the other.

3. The tool holder (22), according to claim 2, wherein the short vibration absorbing mass (54b) is located closer to the forward end of the tool holder (22) than the long vibration absorbing mass (54a).

4. The tool holder (22), according to claim 2, wherein whichever one of the long and short vibration absorbing masses (54a, 54b) is closer to the forward end of the tool holder (22) has a density which is greater than a density of other one of the long and short vibration absorbing masses (54a, 54b).

5. The tool holder (22), according to claim 1, wherein the long mass material is more rigid than the short mass material.

6. The tool holder (22), according to claim 1, wherein:
the at least three suspension members (62) comprise at least one central suspension member (63); and
the long and short vibration absorbing masses (54a, 54b) are spaced apart by the at least one central suspension member (63).

7. The tool holder (22), according to claim 6, wherein:
the anti-vibration arrangement (34) comprises four suspension members (62) including:
one suspension member (62) located at the forward mass end (60a) of an axially forward of the two vibration absorbing masses (54a, 54b);
another suspension member (60b) located at the rearward mass end (60b) of an axially rearward of the two the two vibration absorbing masses (54a, 54b), and
two central suspension members (63) spacing apart the two vibration absorbing masses (54a, 54b).

8. The tool holder (22), according to claim 7, wherein the two central suspension members (63) are in elastic contact with each other.

9. The tool holder (22), according to claim 1, wherein the anti-vibration arrangement (34) comprises exactly two vibration absorbing masses (54a, 54b).

10. The tool holder (22), according to claim 1, wherein:
the long vibration absorbing mass (54a) has a constant long mass cross-sectional area (CL) in a plane oriented perpendicular to the long mass central axis (E1) distal the mass ends (60a, 60b) of the long vibration absorbing mass (54a);
the short vibration absorbing mass (54b) has a constant short mass cross-sectional area (CS) in a plane oriented perpendicular to the short mass central axis (E2) distal the mass ends (60a, 60b) of the short vibration absorbing mass (54a); and
the long mass cross-sectional area (CL) is the same as the short mass cross-sectional area (CS).

11. The tool holder (22), according to claim 1, wherein:
both vibration absorbing masses (54a, 54b) have cylindrical shapes with identical diameters; and
in the assembled state, the long mass central axis (E1) and the short mass central axis (E2) are aligned and share a mass common central axis (E) which is parallel to the holder longitudinal axis (B).

12. A cutting tool (20) comprising:
a tool holder (22) in accordance with claim 1; and
a cutting portion (24) located at a forward end of the tool holder (22), the cutting portion (24) comprising at least one cutting insert (26).

13. The cutting tool (20), according to claim 12, wherein the cutting portion (24) is releasably attached to the tool holder (22).

* * * * *